United States Patent [19]

Lu

[11] Patent Number: 4,629,047

[45] Date of Patent: Dec. 16, 1986

[54] FRICTION CLUTCH AND AIR-FLOW PROMOTING DIAPHRAGM SPRING THEREFOR

[75] Inventor: Phong Lu, Wooster, Ohio

[73] Assignee: LuK Lamellen und Kupplungsbau GmbH, Bühl, Fed. Rep. of Germany

[21] Appl. No.: 465,783

[22] Filed: Feb. 11, 1983

[51] Int. Cl.$^4$ .................. F16D 13/44; F16D 13/72
[52] U.S. Cl. .................. 192/70.12; 192/70.27; 192/89 B; 192/113 A; 267/161; 416/60
[58] Field of Search ............. 192/70.12, 70.27, 89 B, 192/113 A; 267/161, 162; 416/60, 235, 243 R, 243 A

[56] References Cited

U.S. PATENT DOCUMENTS

| | | | |
|---|---|---|---|
| 1,132,958 | 1/1984 | Miller | 192/70.12 |
| 2,107,954 | 2/1938 | Morton et al. | 192/113 R |
| 2,117,482 | 5/1938 | Klix | 192/113 A |
| 2,682,943 | 7/1954 | Root | 192/89 B |
| 2,747,166 | 5/1956 | Hoffarth | 267/161 |
| 3,093,228 | 6/1963 | Binder | 192/89 B |

FOREIGN PATENT DOCUMENTS

| | | | |
|---|---|---|---|
| 1103690 | 3/1961 | Fed. Rep. of Germany | 192/89 B |
| 6606711 | 4/1964 | Fed. Rep. of Germany | |
| 1294228 | 3/1977 | Fed. Rep. of Germany | |
| 2094420 | 9/1982 | United Kingdom | 192/89 B |

Primary Examiner—Rodney H. Bonck
Attorney, Agent, or Firm—Peter K. Kontler

[57] ABSTRACT

A diaphragm spring, particularly for use in friction clutches, has a circumferentially complete outer marginal portion and an annulus of radially inwardly extending prongs which alternate with elongated slots and whose tips surround a centrally located opening communicating with the inner end portions of the slots. The intermediate portions of at least some of the prongs are offset with reference to the intermediate portions of the neighboring prongs, as considered in the axial direction of the spring, to provide passages, constituting enlarged portions of the respective slots, which allow for and can promote circulation of large quantities of cooling air when the diaphragm spring rotates with the cover of a friction clutch. The offset intermediate portions of the prongs have an arcuate shape and can be twisted, not unlike the blades of a screw propeller, to further promote the flow of air through the passages. Such offset intermediate portions can be equidistant from the outer marginal portion and/or from the respective tips.

28 Claims, 3 Drawing Figures

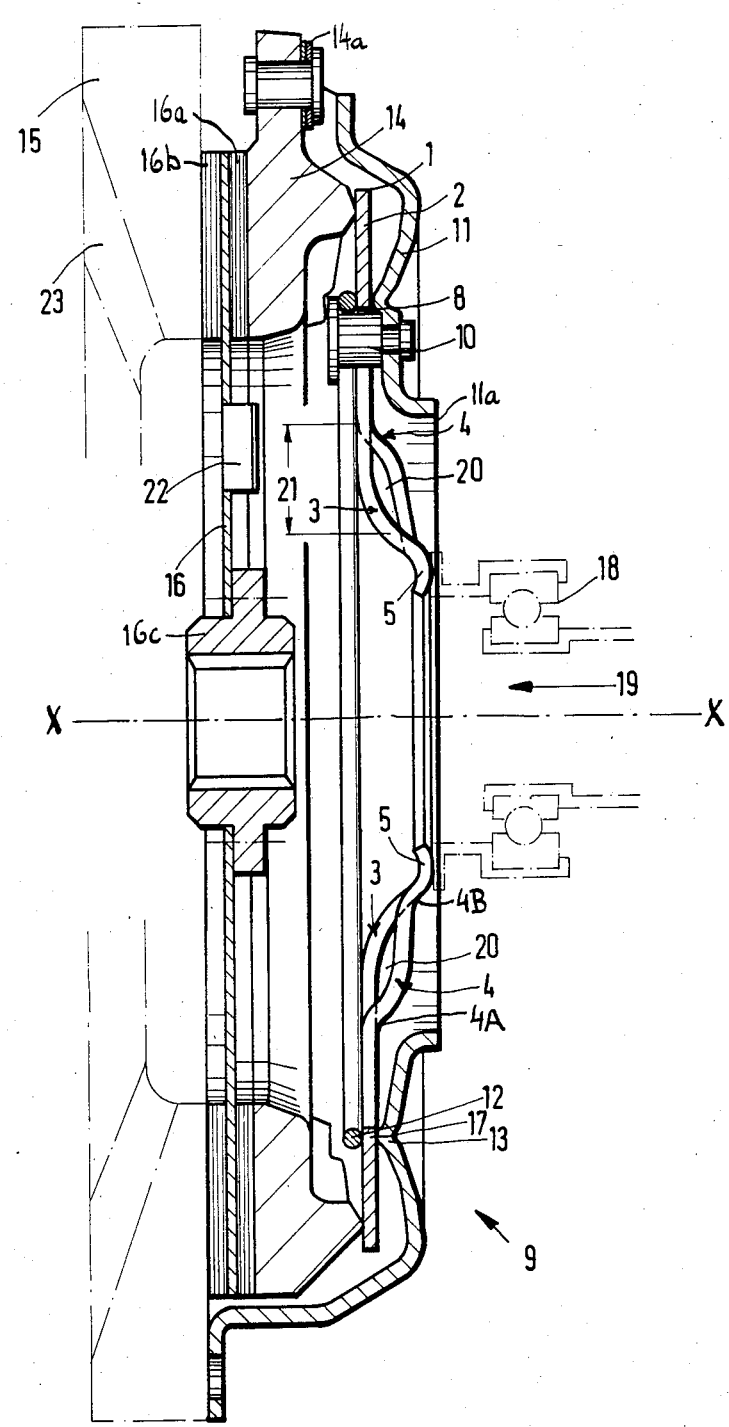

# FRICTION CLUTCH AND AIR-FLOW
PROMOTING DIAPHRAGM SPRING THEREFOR

BACKGROUND OF THE INVENTION

The present invention relates to diaphragm springs, especially for use in friction clutches. More particularly, the invention relates to improvements in diaphragm springs of the type wherein a circumferentially complete outer marginal portion surrounds an annulus of substantially radially inwardly extending prongs which alternate with slots and whose tips surround a substantially centrally located opening.

A diaphragm spring of the above outlined type can be installed between two annular seats which are carried by the cover of a friction clutch, and the tips of the prongs are preferably located at the same level, as considered in the axial direction of the friction clutch, to thus ensure that all of the tips can be engaged by a release bearing when the condition of the clutch is to be changed by pivoting the spring between its seats.

The trend in the automobile industry continues in a direction toward the production of smaller and lighter vehicles without affecting their performance. In fact, the performance of progressively smaller and lighter vehicles is on the increase. Each and every component of the vehicle must or should contribute to the goal of reducing the size and weight, with simultaneous improvement of performance, and this evidently includes the clutch or clutches which are used in the vehicles. Thus, friction clutches which are used in modern automotive vehicles must be compact and of lightweight construction, and their specific performance must be even higher than that of heretofore used bulkier and heavier clutches. On the other hand, the manufacturer of clutches has limited freedom as concerns the selection of materials for some or all of the clutch components, not only because of the cost factor but also as regards the ability of selected materials to stand the stresses which develop in the friction clutch of an automotive vehicle. An important parameter which requires serious consideration is the ability of selected materials to withstand thermal stresses which develop when the clutch is in use. For example, the useful life of friction linings decreases proportionally with increasing temperature. Moreover, distortion of components of a friction clutch also becomes a serious problem at elevated temperatures. In friction clutches wherein the friction linings are mounted on and secured to elastic segments, pronounced rise in temperature is likely to entail setting or even distortion of such segments with attendant adverse effects upon the mode of engagement or disengagement of the clutch and the comfort to the driver and other occupant(s) of the vehicle.

Commonly owned German Pat. No. 1,294,228 proposes to remove friction heat which develops on actuation of a friction clutch. In accordance with the teaching of this patent, the clutch plate is provided with aerating blades which induce the flow of a stream of cool air when the clutch plate rotates. It has been found that such proposal is unsatisfactory when the friction clutch employs a diaphragm spring of the aforementioned type, namely, a spring wherein the radially or substantially radially inwardly extending prongs alternate with rather narrow slots. The combined area of such slots does not suffice to allow for the flow of requisite quantities of cooling air through the clutch, i.e., the blades of the clutch plate are incapable of drawing requisite quantities of air through the slots of the diaphragm spring so that the capacity of such blades to furnish a satisfactory cooling action cannot be utilized in full. In other words, the prongs of the diaphragm spring act not unlike flow restrictors by throttling the flow of air through the slots when the clutch plate rotates and its blades tend to draw air through the diaphragm spring. The centrally located opening of the diaphragm spring is of no help because it is overlapped by the customary release bearing which prevents the flow of substantial quantities of air through the opening.

German Utility Model No. 6 606 711 proposes to provide the slots between the prongs of the diaphragm spring with enlarged portions which are obtained by reducing the width of the neighboring portions of the prongs. Such proposal is unsatisfactory because the enlarged portions of the slots weaken the prongs, i.e., the required strength of the prongs imposes limits upon the dimensions of the enlarged portions of the slots. The end effect is that the rate of air flow through such slots still fails to ensure adequate cooling of all temperature-sensitive components of the friction clutch.

OBJECTS AND SUMMARY OF THE INVENTION

An object of the invention is to provide a diaphragm spring which is constructed and assembled in such a way that it allows for the flow of substantial quantities of air therethrough without unduly weakening the prongs.

Another object of the invention is to provide a simple, compact and inexpensive diaphragm spring which ensures, or at least contributes to, adequate cooling of a friction clutch in which the spring is installed.

A further object of the invention is to provide the diaphragm spring with novel and improved prongs.

An additional object of the invention is to provide a diaphragm spring of the above outlined character which can be used with advantage in existing or presently known types of friction clutches as a superior substitute for conventional diaphragm springs.

A further object of the invention is to provide a novel and improved method of enhancing the ability of a diaphragm spring to allow for the flow of substantial quantities of a gaseous fluid through the slots which alternate with the prongs of such spring.

Another object of the invention is to provide a diaphragm spring which is capable of automatically cooling a friction clutch when the clutch is in use.

An additional object of the invention is to provide a diaphragm spring which contributes to longer useful life of temperature-sensitive components of a friction clutch wherein the spring is put to use.

Another object of the invention is to provide a friction clutch which embodies the above outlined diaphragm spring.

A further object of the invention is to provide a diaphragm spring whose ability to permit air to flow through its slots can be varied within a desired range.

An additional object of the invention is to provide a relatively simple, compact and inexpensive diaphragm spring which exhibits all of the above outlined features and advantages.

One feature of the invention resides in the provision of a diaphragm spring which is especially suitable for use in friction clutches The diaphragm spring comprises a circumferentially complete outer marginal portion and a second portion which defines a substantially centrally located and preferably circular opening. The second portion comprises an annulus of elongated neighboring prongs which extend substantially radially inwardly of the outer marginal portion and have tips which are adjacent to the opening and are located at least substantially at the same level, as considered in the axial direction of the spring. Furthermore, the second portion of the spring is formed with open slots which alternate with the prongs and communicate with the opening. The prongs of the second portion of the spring further have intermediate portions which are disposed radially outwardly of the respective tips, and the intermediate portion of at least one of the prongs is offset with reference to the intermediate portion of at least one neighboring prong, as considered in the axial direction of the spring. The intermediate portion of the one prong can have an arcuate shape and can be spaced apart from the respective tip and/or from the outer marginal portion, as considered in the radial direction of the spring.

In accordance with a modification, the intermediate portion of the one neighboring prong is offset with reference to the intermediate portion of a third prong which is adjacent to the one neighboring prong. The intermediate portions of the one prong and the one neighboring prong can be offset in opposite directions, as considered axially of the spring, and each such offset intermediate portion can have an arcuate shape. All of the offset intermediate portions can be disposed at the same distance from the respective tips and/or at the same distance from the outer marginal portion, as considered radially of the spring.

The arrangement may be such that the intermediate portions of alternate prongs are axially offset with reference to the intermediate portions of neighboring prongs. At least one of the offset intermediate portions can be twisted, e.g., so that it acts like a screw propeller blade.

The offset of the intermediate portion or portions is preferably so pronounced that an offset intermediate portion and the intermediate portion of the neighboring prong or prongs define a passage which extends circumferentially of the spring. The arrangement is preferably such that each prong whose intermediate portion is offset axially and has a more or less arcuate shape includes additional portions merging gradually into the offset intermediate portion. One of these additional portions can be disposed between the offset intermediate portion and the respective tip, and the other additional portion can be disposed between the offset intermediate portion and the outer marginal portion of the spring.

Another feature of the invention resides in the provision of a friction clutch which comprises a cover, a pair of spaced apart substantially annular seats on the cover, and a diaphragm spring disposed between the seats and including a circumferentially complete outer marginal portion disposed radially outwardly of the seats and a second portion disposed radially inwardly of the seats and including alternating prongs and slots. The tips of the prongs are remote from the seats and define a preferably circular opening which communicates with the inner ends of the slots, and such tips are disposed at least substantially at the same level, as considered in the axial direction of the spring. The prongs have intermediate portions disposed radially inwardly of the seats but radially outwardly of the respective tips, and the intermediate portion of at least one of the prongs is offset with reference to the intermediate portion of at least one neighboring prong. The friction clutch further comprises a pressure plate which cooperates with the outer marginal portion of the spring, and release means (e.g., a throw-out bearing) which is movable axially of the spring to pivot the spring between the two seats through the medium of the tips of the prongs.

The intermediate portion of the one prong can have an arcuate shape and can be spaced apart from the respective tip and/or from the outer marginal portion of the spring. Also, the intermediate portion of the one prong can be twisted in the aforediscussed manner. Still further, the intermediate portion of the one prong and the intermediate portion of the one neighboring prong can be offset in opposite directions, as considered axially of the spring. Still further, the intermediate portions of alternate prongs can be offset with reference to the intermediate portions of neighboring prongs.

A further feature of the invention resides in the provision of a friction clutch which comprises a diaphragm spring having a circumferentially complete substantially ring-shaped outer marginal portion and a second portion including elongated prongs which extend inwardly of the outer marginal portion and alternate with elongated slots. The prongs have tips which are remote from the outer marginal portion and outermost portions merging into the outer marginal portion, and the diaphragm spring has a centrally located opening which is surrounded by the tips of the prongs and communicates with the slots. The friction clutch further comprises means (such as the aforementioned ring-shaped seats which are supported by the cover) for pivotably mounting the diaphragm spring intermediate the outer marginal portion and the second portion, a pressure plate which is disposed at one side of the spring and cooperates with the outer marginal portion, and release means which is movable into engagement with the tips of the prongs to thereby pivot the spring relative to the mounting means. The prongs of the diaphragm spring further include intermediate portions disposed between the respective outermost portions and the regions of engagement between the release means and the tips of the respective prongs. Certain selected intermediate portions have a configuration which departs from the configuration of the other intermediate portions. Such configuration is provided inwardly of the mounting means and outwardly of the respective tips.

The intermediate portions are normally curved, and the curvature of the selected intermediate portions deviates from the curvature of the other intermediate portions. This can be achieved by offsetting the selected intermediate portions with reference to the other intermediate portions, as considered in the axial direction of the diaphragm spring.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a sectional view of a friction clutch which employs the diaphragm spring of FIG. 1, the section being taken in the direction of arrows as seen from the line II—II of FIG. 1.

DESCRIPTION OF THE PREFERRED EMBODIMENTS

Figure 1:
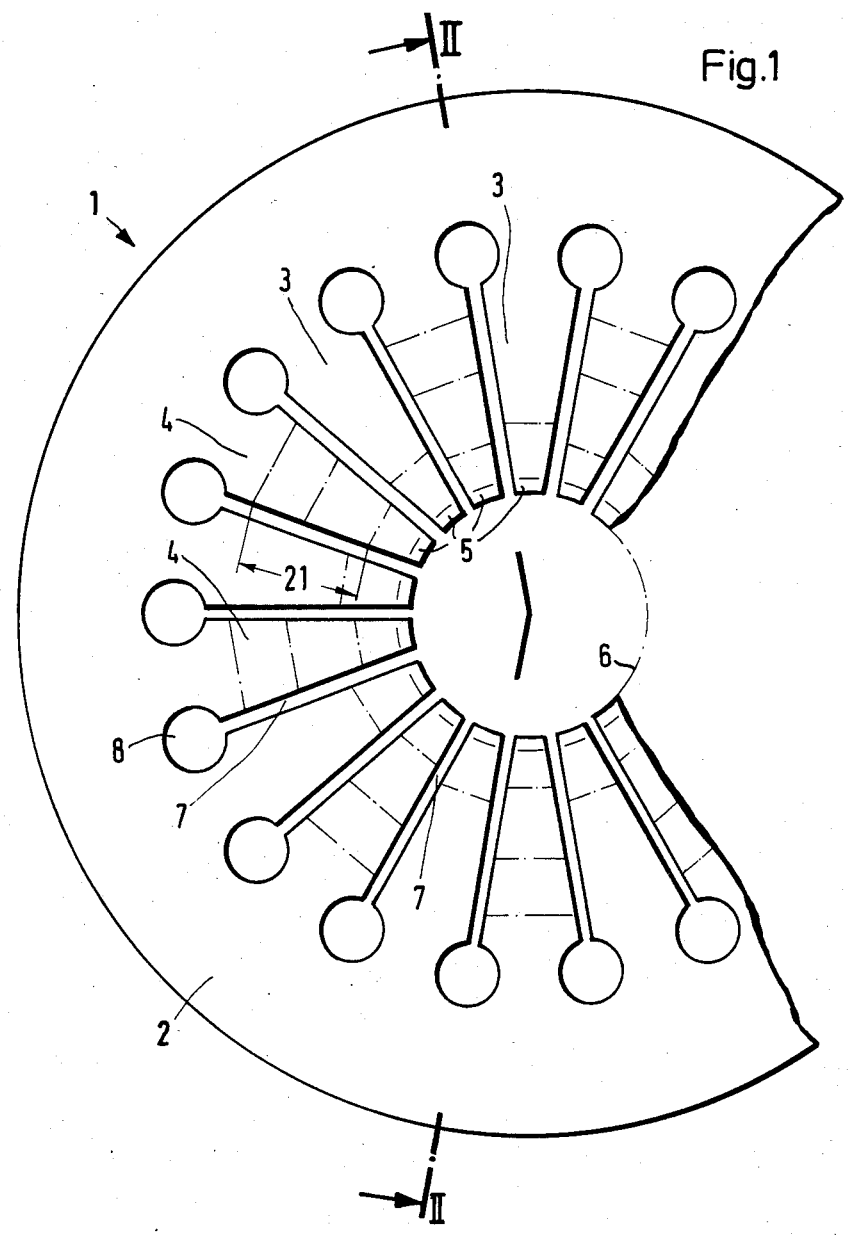
FIG. 1 is a fragmentary plan view of a diaphragm spring which embodies one form of the invention.

FIG. 1 shows a portion of a diaphragm spring 1 which comprises a circumferentially complete outer marginal portion 2 and a second or inner portion which is surrounded by the marginal portion 2 and includes radially inwardly extending prongs 3 and 4 alternating with relatively narrow slots 7. The inner end portions or tips 5 of the prongs 3 and 4 surround a centrally located circular opening 6 of the spring 1, and such opening communicates with the radially innermost portions of the slots 7. The tips 5 of all of the prongs 3 and 4 are located at the same level (see FIG. 2); this is desirable in order to ensure simultaneous engagement of all of the tips 5 by the clutch release device 18 (shown in FIG. 2) when the latter is caused to move in the direction which is indicated by the arrow 19. The slots 7 have enlarged radially outermost portions 8 forming an annulus which is surrounded by the marginal portion 2.

The dimensions of the prongs 3 and 4, as considered in the circumferential direction of the diaphragm spring 1, are the same. This can be seen in FIG. 1. The prongs 3 alternate with the prongs 4, as considered in the circumferential direction of the spring 1, and each of these prongs has a substantially-shovel-shaped intermediate portion 21 which is spaced apart from the outer marginal portion 2 as well as from the respective tip 5. In the embodiment of FIGS. 1 and 2, all of the intermediate portions 21 are located at the same distance from the marginal portion 2, and all of these intermediate portions are located at the same distance from the respective tips 5. The intermediate portions 21 may but need not necessarily constitute the central portions of the respective prongs 3 and 4.

In accordance with a feature of the invention, and as can be readily seen in FIG. 2, the intermediate portions 21 of the prongs 3 are offset with reference to the intermediate portions 21 of the neighboring prongs 4, as considered in the axial direction of the spring 1. Also, the intermediate portions 21 of the prongs 3 are offset in a first direction (to the left, as viewed in FIG. 2) and the intermediate portions 21 of the prongs 4 are offset in a second direction (to the right, as viewed in FIG. 2), as considered in the axial direction of the spring 1. Each of the intermediate portions 21 has an arcuate shape with the convex sides of the intermediate portions 21 of the prongs 3 facing away from the convex sides of intermediate portions 21 of the prongs 4, and the concave sides of the intermediate portions 21 of prongs 3 facing the concave sides of the intermediate portions 21 of prongs 4, as considered in the axial direction of the spring 1. The prongs 3 and 4 include additional portions which gradually merge into the respective intermediate portions 21. For example, the intermediate portion 21 of the downwardly extending prong 4, as viewed in FIG. 2, merges gradually into an additional portion 4A which extends toward the marginal portion 2, and into an additional portion 4B which extends toward the respective tip 5.

Other component parts of the friction clutch 9 which is shown in FIG. 2 include a housing having a cover 11 provided with a circular bead 13 constituting a seat for the right-hand side of the diaphragm spring 1, a wire-like circular second seat 12 which is adjacent to the left-hand side of the diaphragm spring 1 and is in register with the seat 13, a set of fasteners 10 in the form of rivets whose shanks extend through the enlarged portions 8 of slots 7 and serve to secure the seat 12 to the cover 11, a pressure plate 14 which is adjacent to the left-hand side of the marginal portion 2 of the diaphragm spring 1, a flywheel 15 which is driven by the engine of the automotive vehicle, and a carrier 16 of friction linings 16a, 16b which is disposed between the flywheel 15 and the pressure plate 14. The carrier 16 has a hub 16c which is formed with internal splines and serves to transmit torque to the input element of a transmission, not shown. The carrier 16 is rotated when the marginal portion 2 of the diaphragm spring 1 is free to urge the pressure plate 14 against the adjacent friction lining 16a whereby the other friction lining 16b bears against and is driven by the flywheel 15. The diaphragm spring 1 is installed in stressed condition, i.e., its outer marginal portion 2 biases the pressure plate 14 against the adjacent friction lining 16a. When the release device 18 is shifted in the direction of arrow 19, the diaphragm spring 1 pivots between the seats 12, 13 and its marginal portion 2 moves in a direction to the right, as viewed in FIG. 2, so that the clutch plate 14 is moved in a direction to the right under the action of leaf springs 14a (one shown) serving to connect the clutch plate to the cover 11. The flywheel 15 is then free to rotate with reference to the carrier 16 and hub 16c. The region (17) where the diaphragm spring 1 pivots between the seats 12 and 13 in response to leftward or rightward movement of the release device 18 is located immediately radially outwardly of the annulus of enlarged slot portions 8. As mentioned above, the tips 5 of all of the prongs 3 and 4 are preferably located at the same level so that each prong can participate equally in pivoting of the spring 1 at 17 in response to depression (leftward movement) of the release element 18. As can be readily seen in FIG. 2, the right-hand sides of the tips 5 are convex so that each thereof is in mere linear contact with the adjacent portion of the release device 18.

The aforementioned arcuate intermediate portions 21 of the prongs 3 and 4 are disposed radially inwardly of the seats 12, 13 and rather close to the respective tips 5. Due to the fact that the intermediate portions 21 of the prongs 3 are offset in one axial direction and the intermediate portions 21 of the prongs 4 are offset in the other axial direction of the diaphragm spring 1, such intermediate portions define a passage 20 which extends circumferentially of the diaphragm spring and cooperates with the radially extending slots 7 to allow for the flow of large quantities of air between the prongs 3 and 4, as considered in the axial direction of the spring 1, when the flywheel 15 rotates. As shown in the lower portion of FIG. 2, the flywheel 15 is connected with the cover 11 so that the diaphragm spring 1 rotates about its axis whenever the flywheel 15 is in motion.

FIG. 2 further shows that the intermediate portions 21 of the prongs 3 need not be exact mirror images of intermediate portions 21 of the prongs 4. Each of these intermediate portions has an arcuate shape. The passage 20 is a composite ring-shaped passage whose center is located on the axis X—X of the clutch 9. Each intermediate portion 21 is gradually bent out of a position of alignment with the neighboring intermediate portions and thereupon gradually returns into alignment with such neighboring intermediate portions. This holds true in either direction, i.e., as viewed from the tip 5 of a prong 3 or 4 toward the outer marginal portion 2, or in the opposite direction.

The number of arcuate intermediate portions 21 depends on the desired rate of flow of cooling air between the prongs 3 and 4 of the improved diaphragm spring. For example, it may suffice (in certain friction clutches) to impart to the intermediate portions 21 of the prongs 3 the aforediscussed arcuate shape and to leave the intermediate portions 21 of the prongs 4 unchanged, or vice versa. The feature that the intermediate portions 21 of the prongs 3 are offset in one direction and the intermediate portions 21 of the prongs 4 are offset in the opposite direction (as considered axially of the diaphragm spring 1) contributes to the formation of a large passage 20 which allows a substantial quantity of air to circulate through the clutch 9 in response to rotation of the flywheel 15. The cross-sectional area of the passage 20 is further increased due to the fact that the intermediate portions 21 of the prongs 3 are located at the same distance from the axis X—X as the intermediate portions 21 of the prongs 4.

The intermediate portions 21 of the prongs 3 and 4 can generate at least some flow of air as soon as the flywheel 15 begins to rotate in order to drive the cover 11 and hence the diaphragm spring 1. However, such circulation can be promoted or engendered exclusively by a set of blades 22 at the right-hand side of the carrier 16 so that such blades establish or greatly intensify the flow of air between the prongs 3, 4 of the spring 1. Still further, the circulation of air can be promoted by the provision of suitably inclined channels 23 in the flywheel 15.

The cooling air which is caused to flow between the prongs 3 and 4 of the diaphragm spring 1 enters the clutch 9 through the central opening 11a of the cover 11 and can leave the clutch by flowing radially outwardly along the leaf springs 14a which connect the clutch plate 14 with the cover 11. The springs 14a ensure that the clutch plate 14 shares the angular movements of the cover 11 but is movable axially between the cover and the flywheel 15.

Figure 3:
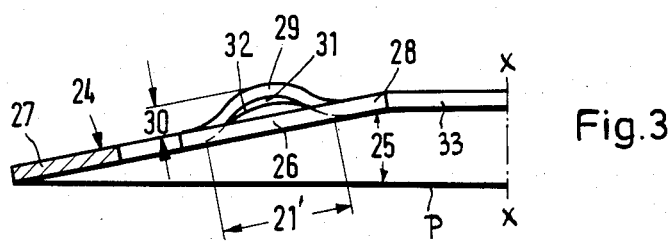
FIG. 3 is a fragmentary axial sectional view of a modified diaphragm spring.

FIG. 3 shows a portion of a modified diaphragm spring 24 in the unstressed condition. The circumferentially complete outer marginal portion of this spring is shown at 27 and the inclination of this marginal portion, as well as of the prongs 26 and 29, relative to a plane P which is normal to the axis X—X of the spring 24 is shown at 25. In the unstresed condition, the diaphragm spring 24 constitutes the hollow frustum of a cone. The prongs 26 of the unstressed spring 24 are flat or nearly flat, and their tips 28 are adjacent to a centrally located preferably circular opening 33. The prongs 26 alternate with prongs 29 having shovel-shaped intermediate portions 21' of arcuate shape which bulge outwardly beyond the outer sides of the remaining portions of the respective prongs 29. The extent to which the central regions of the intermediate portions 21' bulge outwardly beyond the outer sides of the prongs 29 (i.e., the extent of axial offset of 21') is shown at 30. The distance 30 exceeds the thickness of the prongs 29 so that the prongs 29 (which alternate with the prongs 26) define an interrupted circumferentially extending passage 31 for the flow of air through the diaphragm spring 24 (such flow takes place in addition to the flow of air through the elongated radially extending slots between the neighboring prongs 26 and 29).

The arcuate line 32 denotes in FIG. 3 that one marginal zone of the illustrated axially offset intermediate portion 21' is more distant from the adjacent prong 26 than the other marginal zone, as considered in the axial direction of the diaphragm spring 24. In other words, the intermediate portion 21' is twisted, not unlike the blade of a screw propeller or a shovel. Thus, the width of the passage 31 varies, as considered in the circumferential direction of the diaphragm spring 24. It has been found that intermediate portions 21' of the just outlined configuration contribute significantly to axial flow of air through the diaphragm spring 24 when the latter is driven by the cover of the friction clutch, i.e., the intermediate portions 21' not only provide more room for the flow of air between the prongs 26, 29 but they actually force air to flow between such prongs to ensure highly satisfactory cooling of the friction clutch.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A diaphragm spring, especially for use in friction clutches, comprising a circumferentially complete outer marginal portion and a second portion defining a substantially centrally located opening, said second portion comprising an annulus of elongated neighboring prongs having tips adjacent to said opening and located at least substantially at the same level, as considered in the axial direction of the spring, said second portion further having open slots alternating with said prongs and communicating with said opening, said prongs further having intermediate portions disposed radially outwardly of the respective tips and the intermediate portion of at least one of said prongs being offset with reference to the intermediate portion of at least one neighboring prong in a single direction, as considered axially of said spring.

2. The diaphragm spring of claim 1, wherein the intermediate portion of said one prong has an arcuate shape.

3. The diaphragm spring of claim 2, wherein the intermediate portion of said one prong is spaced apart from the respective tip, as considered in the radial direction of said spring.

4. The diaphragm spring of claim 2, wherein the intermediate portion of said one prong is spaced apart from said outer marginal portion, as considered in the radial direction of said spring.

5. The diaphragm spring of claim 1, wherein the intermediate portion of said one neighboring prong is offset with reference to the intermediate portion of a third prong which is adjacent to said one neighboring prong.

6. The diaphragm spring of claim 5, wherein the intermediate portions of said one prong and said one neighboring prong are offset in opposite directions, as considered axially of said spring.

7. The diaphragm spring of claim 6, wherein each of said offset intermediate portions has an arcuate shape.

8. The diaphragm spring of claim 6, wherein said offset intermediate portions are disposed at the same distance from the respective tips.

9. The diaphragm spring of claim 6, wherein said offset intermediate portions are disposed at the same distance from said outer marginal portion.

10. The diaphragm spring of claim 1, wherein the intermediate portions of alternate prongs are axially offset in a single direction with reference to the intermediate portions of neighboring prongs.

11. The diaphragm spring of claim 1, wherein the intermediate portion of said one prong is twisted.

12. The diaphragm spring of claim 11, wherein said twisted intermediate portion acts like a screw propeller blade.

13. The diaphragm spring of claim 1, wherein the intermediate portion of said one prong and the neighboring prongs define a passage extending circumferentially of the spring.

14. The diaphragm spring of claim 1, wherein said one prong includes two additional portions merging gradually into and flanking the intermediate portion of said one prong.

15. The diaphragm spring of claim 1, wherein the entire intermediate portion of said at least one prong is offset with reference to the intermediate portion of said at least one neighboring prong.

16. A friction clutch comprising a cover; a pair of spaced apart substantially annular seats on said cover; a diaphragm spring disposed between said seats and including an outer marginal portion disposed radially outwardly of said seats, an annulus of prongs having tips located radially inwardly of said seats and disposed at least substantially at the same level, as considered axially of the spring, and open slots alternating with said prongs and extending radially inwardly from said outer marginal portion, said prongs having intermediate portions disposed radially inwardly of said seats and radially outwardly of the respective tips, the intermediate portion of at least one of said prongs being axially offset in a single direction with reference to the intermediate portion of at least one neighboring prong; a pressure plate having a portion adjacent to the outer marginal portion of said spring; and release means movable axially of said spring to pivot the spring between said seats through the medium of said tips.

17. The friction clutch of claim 16, wherein the intermediate portion of said one prong has an arcuate shape and is spaced apart from said outer marginal portion of the spring.

18. The friction clutch of claim 16, wherein the intermediate portion of said one prong has an arcuate shape and is spaced apart from the respective tip.

19. A friction clutch comprising a diaphragm spring having a circumferentially complete substantially ring-shaped outer marginal portion and a second portion including elongated prongs extending inwardly of said outer marginal portion and alternating with elongated slots, said prongs having tips remote from said outer marginal portion and said spring further having a centrally located opening surrounded by said tips and communicating with said slots, said tips being located at least substantially at the same level, as considered in the axial direction of the spring; means for pivotably mounting said spring intermediate said outer marginal portion and said second portion; a pressure plate adjacent to one side of said spring and cooperating with said outer marginal portion; and release means movable into engagement with the tips of said prongs to thereby pivot said spring relative to said mounting means, said prongs including intermediate portions disposed between said outer marginal portion and the region of engagement between said release means and said tips, some of said intermediate portions extending in part beyond the other intermediate portions as considered in a single direction axially of said spring.

20. The friction clutch of claim 19, wherein said intermediate portions are curved and the curvature of said some intermediate portions deviates from the curvature of the other intermediate portions.

21. A diaphragm spring, especially for use in friction clutches, comprising a ring-shaped main portion and an annulus of prongs, extending inwardly from said main portion and defining slots, said prongs having tips located at least substantially at the same level and defining a centrally located opening which communicates with said slots, each of said prongs having an intermediate portion disposed radially outwardly of the respective tip, and at least the majority of said intermediate portions including substantially shovel-shaped projections extending axially of the spring in a single direction, the height of each of said projection—as measured in the axial direction of the spring—varying in the the circumferential direction of the spring.

22. The diaphragm spring of claim 21, wherein each of said intermediate portions includes a substantially shovel-shaped projection.

23. The diaphragm spring of claim 21, wherein each of said projections has an arcuate shape as considered in the radial direction of the spring.

24. The diaphragm spring of claim 21, wherein the intermediate portion of a pair of neighboring prongs have parts which are adjacent to the slot between the prongs of such pair and are axially offset relative to each other.

25. The diaphragm spring of claim 24, wherein said part of the intermediate portion at one side of a slot is at least substantially flat and said part of the projection at the other side of such slot is axially offset with reference to the part at the one side of the slot.

26. The diaphragm spring of claim 21, wherein the prongs of each pair of neighboring prongs include a first prong having a marginal zone adjacent to the respective slot and located at least close to said level and a second prong having a marginal zone adjacent to the respective slot and being axially offset with reference to the marginal zone of the first prong.

27. A friction clutch, comprising a cover; a pair of spaced apart substantially annular seats on said cover; a diaphragm spring disposed between said seats and including a ring-shaped main portion disposed radially outwardly of said seats and an annulus of prongs extending inwardly from said main portion and defining slots, said prongs having tips located at least substantially at the same level, disposed radially inwardly of said seats and defining a centrally located opening which communicates with said slots, each of said prongs having an intermediate portion disposed radially outwardly of the respective tip and at least the majority of said intermediate portions including substantially shovel-shaped projections extending axially of the spring in a single direction, the height of each of said projections—as measured in the axial direction of the spring—varying in the circumferential direction of the spring, said intermediate portions being disposed radially inwardly of said seats; a pressure plate having a portion adjacent to the main portion of said spring; and release means movable axially of said spring to pivot the spring between said seats through the medium of said tips.

28. A friction clutch comprising a diaphragm spring having a ring-shaped main portion and a second portion including an annulus of prongs extending inwardly from said main portion and defining slots, said prongs having tips located at least substantially at the same level and defining a centrally located opening which communicates with said slots; means for pivotally mounting said spring intermediate said main portion and said second portion; a pressure plate adjacent to one side of said spring and cooperating with said main portion; and release means movable into engagement with the tips of said prongs to thereby pivot said spring relative to said mounting means, said prongs including intermediate portions disposed between said main portion and the region of engagement between said release means and said tips and at least the majority of said intermediate portions including substantially shovel-shaped projections extending axially of the spring in a single direction, the height of each of said projections—as measured in the axial direction of the spring—varying in the circumferential direction of the spring.

* * * * *